Patented Feb. 14, 1950

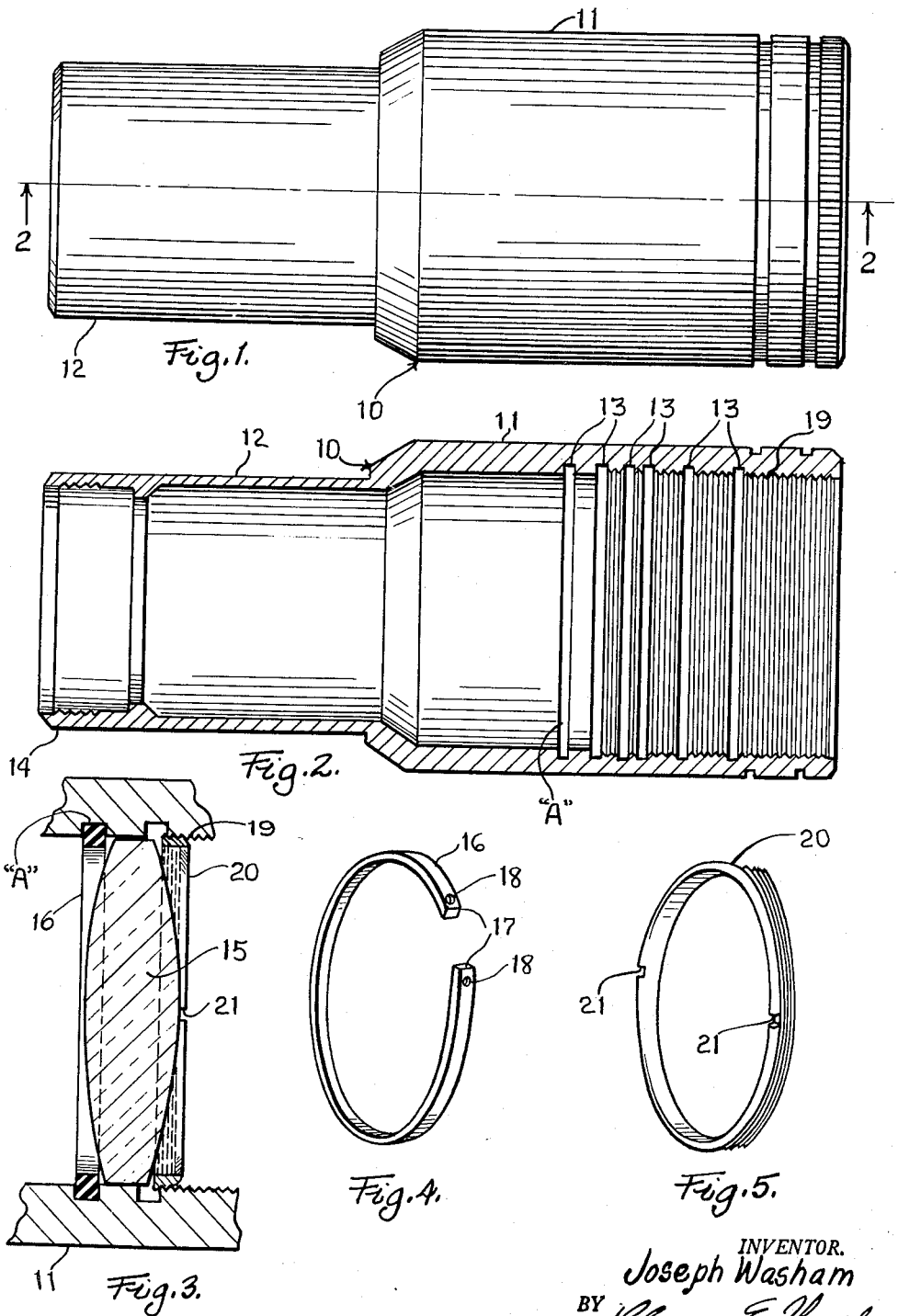

2,497,147

UNITED STATES PATENT OFFICE 2,497,147

LENS BARREL

Joseph Washam, Chicago, Ill., assignor to De Vry Corporation, Chicago, Ill., a corporation of Illinois Application June 18, 1947, Serial No. 755,407

1 Claim. (Cl. 88—57)

This invention relates to lens barrels and has particular reference to a lens barrel for use in the motion picture field. As such, it has for its principal object the provision of an improved construction of the character hereinafter set forth which will be highly efficient in use and economical in manufacture.

Lens barrels with which my invention is particularly related and which are used in the motion picture field come in different lengths. As a result, in order for the manufacturer to meet the demand for these lens barrels it is necessary that he maintain a large inventory at considerable cost. In addition to this he is confronted with the problem of maintaining an economical selling price while confronted with an excessive manufacturing cost as results from the necessity of the manufacturer keeping an inventory of lens barrels of different lengths.

One of the many objects of my invention is to provide a universal lens barrel, that is, one having an arrangement whereby the lens may be mounted in the barrel at any one of a number of positions depending upon the requirements of the purchaser. In this way the inventory of the manufacturer is maintained at a minimum with considerable saving.

Another and equally important object of the invention is the novel arrangement employed for mounting a lens at any one of a selected position within a lens barrel.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of the lens barrel embodying my invention;

Fig. 2 is a sectional detail view of the same taken substantially on line 2—2 of Fig. 1, showing the lens disassembled therefrom;

Fig. 3 is a fragmentary sectional detail view similar to Fig. 2 showing the lens in mounted position;

Fig. 4 is a perspective view of a locating ring embodied in the invention; and

Fig. 5 is a perspective view of a retainer ring embodied in the invention.

The several objects are accomplished by the preferred form of construction shown in the accompanying drawings in which drawings I have illustrated one embodiment of my invention, it being pointed out that this illustration is the preferred form of construction, and I, therefore, do not wish to be limited to the precise form there shown.

In this connection the lens barrel is indicated at 10 and includes a barrel portion 11 in which the lens is mounted and a reduced barrel portion 12. This barrel 10 may be formed of stock material or may be turned to the form shown, in a manner well known in the art.

The barrel portion 11 has formed therein a plurality of internal seats or grooves 13. These grooves 13 are arranged in spaced relation with respect to each other and are each positioned with respect to the forward end portion 14 of the barrel portion 12 in a manner such that the distance between each groove 13 and the end portion 14 is comparable to the length of a barrel which will meet the proper requirements and specification of the purchaser and in this manner I provide a lens barrel which in fact may be said to be universal.

The lens 15 is mounted in the barrel portion 11 in the following manner:

Assuming that a lens barrel is required which is of a length requiring the lens to be positioned contiguous the first groove a of the grooves 13. In this groove a there is mounted a locating ring 16 of the split-ring type and formed of such material as permits the adjacent end portions 17 thereof to be compressed toward each other so as to permit insertion of the ring 16 within the barrel portion 11 for mounting in the groove a to form a supporting shoulder for the annular edge of the lens. This compression of the ring 16 may be accomplished by the use of a plier-like tool (not shown) having spaced pins adapted to be projected in openings 18 formed in the end portions 17 whereby when the pliers or like tool is closed, the closing of the pliers will compress the ring 16 for the purposes hereinbefore stated.

Should it require that the ring 16 be removed from the groove a, this may be done in the same manner as in mounting the ring 16 in the groove.

Positioned against this locating ring 16, which locating ring may be formed of any suitable material such as fibre, metal, rubber, or the like, is the lens 15. The internal surface of the barrel portion 11 is provided with screw threads 19 and threaded into the barrel 11 is a retainer ring 20 which likewise may be formed of any suitable material to provide an annular shoulder for engaging the annular edge of the lens to secure and position the same against the shoulder of the ring 16. To facilitate threading this retainer ring 20 into the barrel, tool-notches 21 are provided.

From the foregoing description it will be apparent that the locating ring 18 may be seated in any one of the grooves 13 and that when thus seated, the lens 15 will be securely and firmly held in place by the retainer ring 20. By the foregoing construction I provide a lens barrel capable of compensating for lens barrels of various lengths. By such an arrangement the manufacturer is in a position to materially reduce his inventory of lens barrels at a substantial saving.

Any number of grooves 13 may be formed in the barrel 11 and the distance between these grooves may vary to meet certain specific requirements.

Having thus described my invention, what I claim as new and desire to protect by Letters Patent is:

A lens holder comprising a barrel having formed in its interior surface a plurality of circumferentially extending grooves axially spaced at different distances from each other, said interior surface in which said grooves are formed providing screw threads over a major portion thereof, a lens for said barrel, and means for mounting said lens in a predetermined position within said barrel, said means including a locating ring adapted to be mounted in any one of said grooves and forming a shoulder for said lens, and a retainer ring having a threaded surface engaging the interior thread bearing surface of said barrel for positioning adjacent any one of said grooves, said retaining ring having an annular shoulder engaging the edge of said lens to position the same against the shoulder of the locating ring.

JOSEPH WASHAM.

REFERENCES CITED

The following references are of record in the file of this patent:

UNITED STATES PATENTS

| Number | Name | Date |
|---|---|---|
| 1,148,550 | Thompson | Aug. 3, 1915 |
| 1,156,389 | Bugbee | Oct. 12, 1915 |
| 1,258,621 | Jenkins | Mar. 5, 1918 |
| 1,831,626 | Kruening | Nov. 10, 1931 |
| 2,008,991 | Nowack | July 23, 1935 |
| 2,107,720 | Swander | Feb. 8, 1938 |
| 2,229,594 | Seiler | Jan. 21, 1941 |
| 2,377,056 | Tontrup | May 29, 1945 |